United States Patent [19]

Belsterling et al.

[11] 4,323,830

[45] Apr. 6, 1982

[54] DC MOTOR CONTROL USING MOTOR-GENERATOR SET WITH CONTROLLED GENERATOR FIELD

[75] Inventors: Charles A. Belsterling, Norristown, Pa.; John Stone, Medford, N.J.

[73] Assignee: The Franklin Institute, Philadelphia, Pa.

[21] Appl. No.: 151,973

[22] Filed: May 21, 1980

[51] Int. Cl.³ .............................................. H02P 5/20
[52] U.S. Cl. .................................... 318/158; 318/148; 290/16
[58] Field of Search ..................... 322/16, 39; 318/158, 318/145, 140, 147, 148, 157, 139; 290/16, 45, 50

[56] References Cited

U.S. PATENT DOCUMENTS

| | | | |
|---|---|---|---|
| 2,320,841 | 6/1943 | Abell | 318/158 |
| 2,786,974 | 3/1957 | Asbury | 318/145 |
| 3,436,633 | 4/1969 | Hemmenway et al. | 318/145 |
| 3,745,441 | 7/1973 | Soffer et al. | 318/158 X |

Primary Examiner—B. Dobeck
Attorney, Agent, or Firm—John C. Dorfman

[57] ABSTRACT

A d.c. generator is connected in series opposed to the polarity of a d.c. power source supplying a d.c. drive motor. The generator is part of a motor-generator set, the motor of which is supplied from the power source connected to the motor. A generator field control means varies the field produced by at least one of the generator windings in order to change the effective voltage output. When the generator voltage is exactly equal to the d.c. voltage supply, no voltage is applied across the drive motor. As the field of the generator is reduced, the drive motor is supplied greater voltage until the full voltage of the d.c. power source is supplied when the generator has zero field applied. Additional voltage may be applied across the drive motor by reversing and increasing the reversed field on the generator. The drive motor may be reversed in direction from standstill by increasing the generator field so that a reverse voltage is applied across the d.c. motor.

17 Claims, 6 Drawing Figures

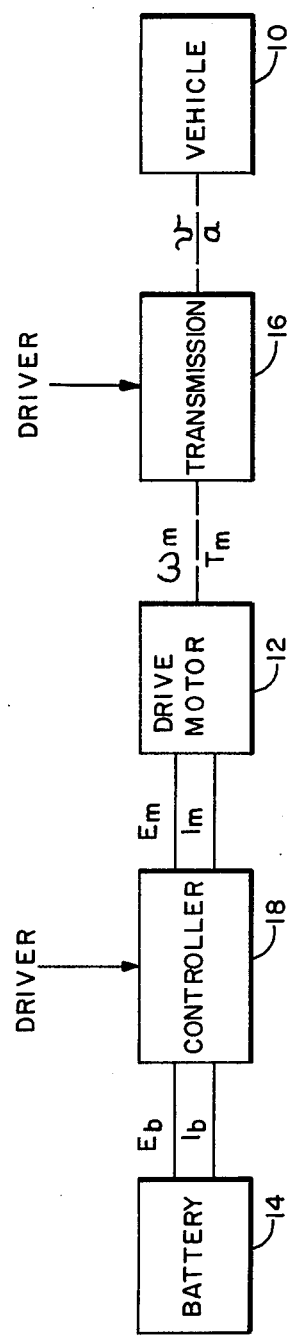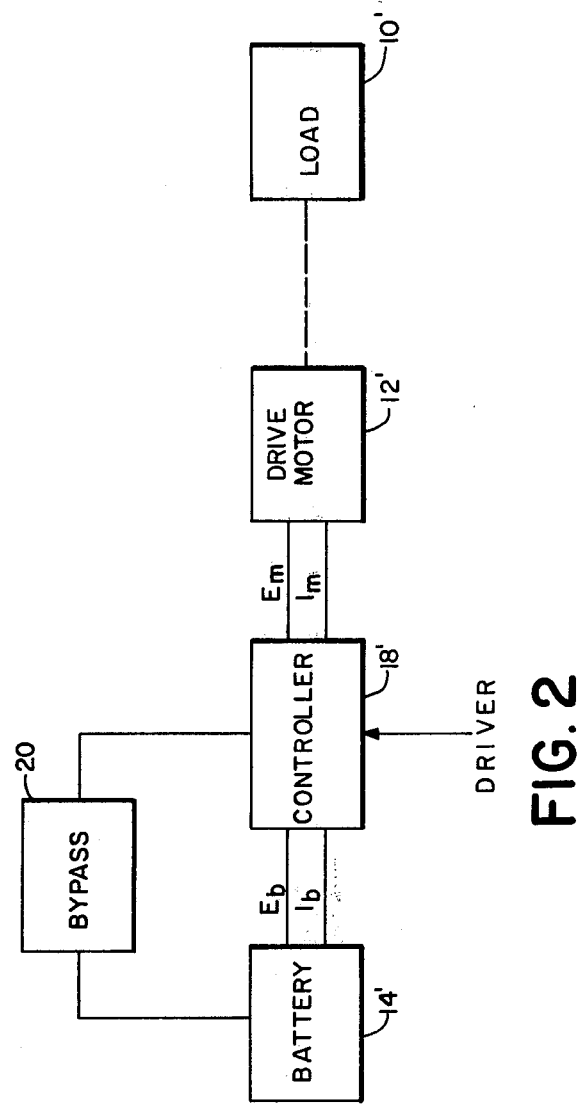

DC MOTOR CONTROL USING MOTOR-GENERATOR SET WITH CONTROLLED GENERATOR FIELD

The present invention relates to a novel system and method of controlling d.c. motors using a motor generator set, the field of whose generator is a controlled variable. More specifically, the present invention relates to a novel system d.c. motor control permitting smooth speed transition in both forward and reverse direction and automatic regenerative braking as speeds are reduced.

The Government has rights in this invention pursuant to Contract No. DEN3-46 awarded by the U.S. Department of Energy.

In view of the increasingly short supply of gasoline and other conventional fuels, considerable effort has been devoted to finding a suitable electrical traction motor for automobiles and other vehicles. Ordinarily, in thinking of traction motors, direct current motors have been considered, and the present invention is directed to control of a direct current motor for this and other purposes.

The most direct and obvious method for controlling a load, be it a direct current motor or other load connected to a fixed voltage source, is by means of a variable series resistance. This method is extremely inefficient, however, because large amounts of energy are dissipated as heat, and as the voltage is decreased on the load, it must be impressed across the series resistance. Thus, at half voltage, an equal amount of energy to that consumed by the load is dissipated as heat by the variable resistance.

The method most widely used in early electric vehicles was battery switching where cells were connected into several equal groups, and the total voltage was varied in steps by means of mechanical contactors. This method historically has suffered from the arcing effects of switching extremely high d.c. currents in an inductive circuit. It also results in poor control characteristics.

For many years the accepted way to control high power variable d.c. motors was by means of a Ward-Leonard System which employs a motor generator set with low power generator field controls. Although highly efficient and quite versatile, such a system is large and heavy because all the power to the vehicle must flow through each machine. Such a system is still used on large off-the-road vehicles where a lingering weight penalty can be tolerated. But, it is impractical for use on small vehicles.

In recent years the solid-state electronic "chopper" has become the most common of controls for electric vehicles. It is operated as a fast acting line switch controlling the ratio of on-time to off-time. The cost effectiveness of regenerative braking circuits in chopper controllers is questionable. Although claims are made for very high efficiencies, when motor losses, battery stress and radiation noise are considered, it is not clearly the "best choice".

The present invention, like the Ward-Leonard System, employs a motor generator set which, however, is differently connected and differently employed. It avoids all of the limitations of the d.c. motor controllers previously used. It does so by employing a rotating machine to recirculate the power that must be "adsorbed" by the controller and to "boost" the power recovered during regenerative braking. More specifically, the present invention relates to a system for controlling a d.c. drive motor subject to variable load. The system requires a source of d.c. power which as will appear hereafter may be derived from a.c. supply for non-vehicle purposes. A motor generator set is employed having a d.c. generator connected in series between the source of power and the drive motor such that common polarity terminals of the power source and the generator are normally connected together so that the generator generates a voltage in opposition to the power source. The generator has at least one field winding which is subject to external control. Motor means rotatably coupled through the d.c. generator to drive the generator is electrically coupled to the source of d.c. power which includes the possibility of an a.c. source and an a.c. motor. Means is provided to vary the at least one field winding of the generator whereby, when the d.c. drive motor is at rest, the field of the generator is controlled so that its generator voltage output is equal to but opposite to the voltage output of the power source. The motor of the motor generator means alternately acts as a motor to drive the generator and as a generator driven by the generator acting as a motor whereby power corresponding to the unused excess energy is fed back into the power source.

As will appear hereafter, the power source may be an a.c. source which has suitable rectifier means to produce the direct current, in which case the motor employed in the motor generator set may be single-phase or three-phase a.c. motor, and when it is driven as a generator, the power is fed back into the power system. If a d.c. supply is used, either a battery or d.c. lines, when the motor is run as a generator power is fed back into the d.c. lines or into the battery to recharge the battery.

The present invention has a number of advantages. For example, it enables zero current to be fed to the drive motor. When the drive motor is at a standstill, it permits the drive motor to be smoothly started, either forward or backward, depending on the polarity of the voltage applied to the drive motor terminals. The motor starts smoothly without need for current limiting devices of any sort and follows a smooth transition to higher speeds without discontinuity or any need for transmission means. Reversing the direction of the drive motor is accomplished by increasing the generator field past the point which is used to bring the drive motor to a standstill.

The generator voltage output is normally subtracted from the battery voltage. Reducing generator voltage to zero gives full battery voltage to the motor. Reversing the generator field, in effect, causes the generator voltage to add to battery voltage and gives an increased drive motor speed and load capability beyond that which would be possible simply using the battery. Again, this can be done by field control means which is continuous so that there is no break in the smooth curve of speed transition. Since the battery voltage must be opposed by generator voltage, a generator of a size to use in the first place is capable of adding to battery voltage so that battery of only half the required or rated voltage of the drive motor is needed.

The system also provides regenerative braking all the way down to zero drive motor speed, and just as satisfactorily, all the way down to zero from reverse speeds. The system controls the torque continuously without steps at any traction motor speed.

For a better understanding of the present invention, reference is made to the accompanying drawings in which:

FIG. 1 is a block diagram representing a conventional traction motor problem;

FIG. 2 is a block diagram showing a bypass controller system;

Figure 3:
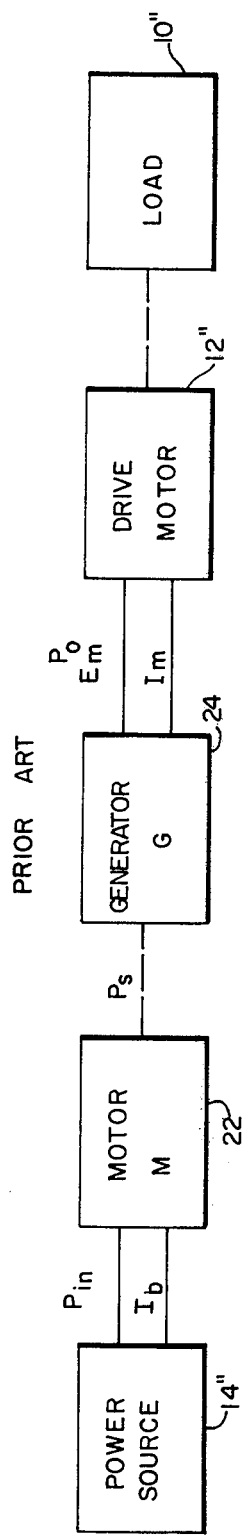
FIG. 3 is a block diagram showing a Ward-Leonard System of power transfer.

FIG. 1 shows the conventional approach to providing a vehicle 10 with a motor 12 supplied with electric power from a battery 14. If the system is conventional, there can be intervention by the driver to control speed at two points. First, at the transmission 16 which mechanically connects the motor to the vehicle and makes possible the trade-off of speed and torque. The second place for intervention is the controller 18 between the battery and the motor which in some manner modifies the output from the battery's constant voltage, for a specific load to a voltage and current appropriate to the motor 12.

In accordance with the present invention, one object is to eliminate the transmission, and the losses and torque discontinuities due to the transmission.

FIG. 2 shows the concept or objectives of the present invention wherein the motor 12' is supplied voltage $E_m$ and current $I_m$ appropriate to its need by intervention of the controller 18' which modifies the voltage or current $E_b$ or $I_b$ supplied by the battery 14'. The concept also involves some sort of a bypass or feedback means 20 to put energy back into the power source when it is not needed by the motor.

FIG. 3 shows a prior art Ward-Leonard power transmission system using a motor 22 mechanically connected by power shaft ($P_s$) to a generator 24. The motor is supplied by a power source 14' which may be a variable power source. The load 10'' is driven by drive motor 12'' whose power is supplied by generator 24. The Ward-Leonard System is a very good system for many applications, but it tends to be heavy and much too heavy fo use on a motor vehicle.

Figure 4:
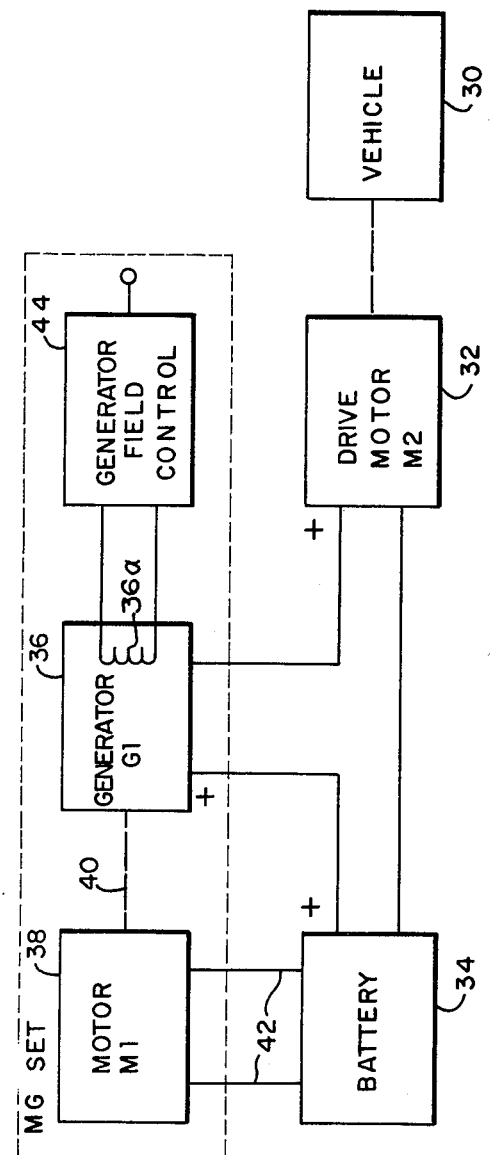
FIG. 4 is a block diagram showing the concept of the system of the present invention applied to a d.c. system.

The applicants have conceived the system of FIG. 4 wherein a vehicle 30 is mechanically driven by a direct current drive motor 32 receiving its principal power from a direct current battery 34. However, a generator 36, in accordance with the present invention, is connected in series opposition to the battery 34. That is, similar polarity terminals of the generator and the battery are connected together, such as the positive terminals shown in the drawing. Thus, voltage generated by the generator opposes battery voltage in the forward direction of generator rotation. The generator is driven by a motor 38 mechanically coupled together by shaft 40 to provide a motor generator set. The motor 38 receives it power via lines 42 from the battery 34, and, as will be explained hereafter, returns power to the battery when the motor is operating as a generator. The generator 36 has at least one field winding 36a which is variably controlled by a generator field controller 44 which may be manually adjusted and controlled by the operator of the vehicle to achieve desired response of motor 32 in driving vehicle 30.

Using the system when the vehicle is at rest, the generator terminal voltage is controlled through its field to to be exactly equal to the battery voltage, and no current flow to the drive motor armature circuit. To accelerate and run the vehicle, the generator field is decreased, reducing the generated voltage and allowing the difference between the battery and the generator voltage to be applied to the drive motor. This can be done in a continuous, as opposed to stepwise, manner allowing for the smooth acceleration and constant power connection to the motor. If more power is required than that available from the battery, the generator field is simply reversed in a continuous non-stepwise movement and the polarity of the generator, then, effectively adds to the battery supplying a higher voltage at the motor terminals.

If the motor 32 and the vehicle is to be reversed, instead of decreasing energy in the field winding 36a, the field is increased, and the reversed polarity of the net voltage across the generator and battery causes the drive motor to run in the opposite direction. Again, this reversal is smooth and continuous and reverse speed can be controlled by the field control 44 just as forward speed can be.

When the vehicle is to be slowed, the system automatically provides regenerative braking, either in the forward or reverse direction. For braking from the forward speeds, the generator field is increased, raising the sum of the traction motor 32 back emf and the generator voltage above battery voltage. In this way energy can be returned to the battery 34 at any traction motor speed down to zero.

Thus, the system of FIG. 4 provides a smooth continuous d.c. motor control providing continuously variable speeds, both in forward and backward directions permitting standstill (non-driving) condition and inherently providing the regenerative braking in both directions.

The d.c. generator 36 can be relatively light and small in size, and the motor-generator set motor 38, therefore, need not be large. Yet, the capability of the system is much extended over the battery alone, allowing for higher speeds and reversal of the drive motor 32 direction. Since the parts are small and light, and familiar components, service is relatively simple and low cost. The control circuits are maintained as low power circuits. There is no need for pulsed power, with consequent power loss and shortened life. There are no high voltage transients introduced, and there is a minimum of electromagnetic interference. Generally overall efficiency is quite high and the operating range is substantially extended over that which would be available with the battery alone.

The generator field control 44 is a low power field control involving no hazard or complication to the driver, and in addition to eliminating the inefficiencies of the transmission, provides easily controlled and smoother acceleration and deceleration than possible even with automatic transmissions.

Figure 5:
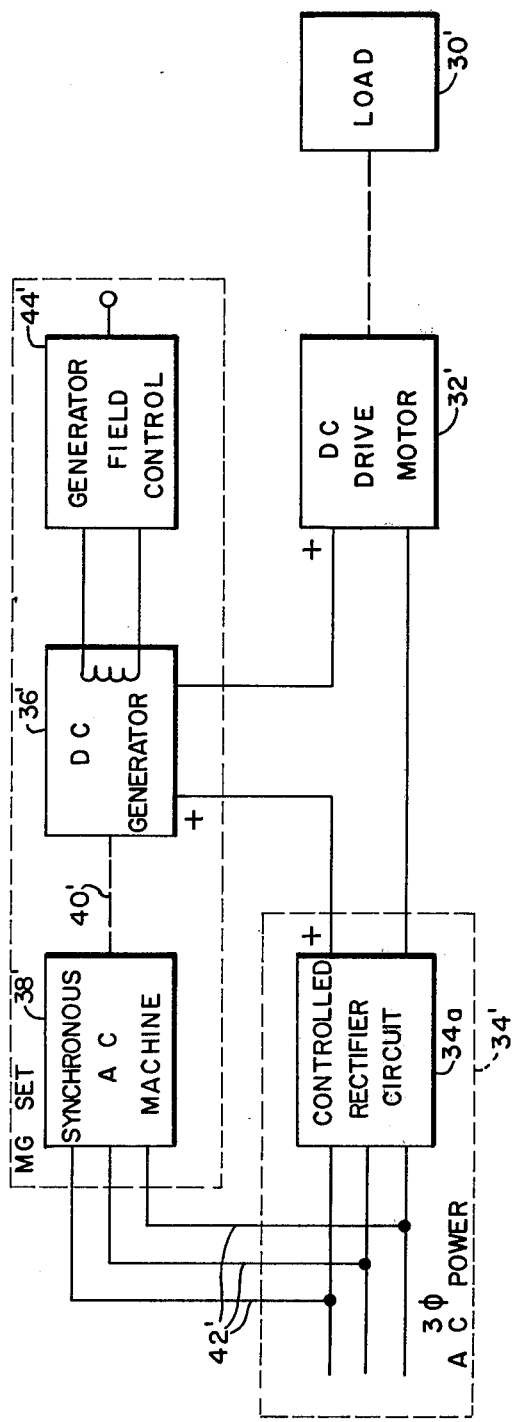
FIG. 5 is a block diagram showing a similar system in accordance with the present invention applied to an a.c. supplied system for a d.c. motor.

The alternating current feed d.c. supply system of FIG. 5 is essentially the same as that of FIG. 4. Certainly the load 30', although probably not a vehicle in the alternating current application, still appears to the d.c. drive motor 32' as the same kind of a problem. The source of d.c. current 34' is no longer a battery, but a controlled rectifier circuit 34a converts the three phase, a.c. power input into direct current. As in the FIG. 4 system, like polarity terminals of the source d.c. power and the d.c. generator 36' are connected together in connecting the generator 36' in series with the motor 32' across the source of d.c. power of 34'. Motor 38' of the motor-generator set must, of course, be modified for the a.c. application. Advantageously, motor 38' is a synchronous alternating current machine operable on the three-phase a.c. supply power. In a preferred embodiment, however, the mechanical coupling 40' between the generator 36' and the motor 38' is of the same nature. The field winding 36a which is controlled by generator field control 44' remains essentially the same, and the manual control which is accomplished observing the effect upon the load, or, alternatively observing instrumentation, or in an automatic feedback loop has not changed. Conceivably the components might be higher powered components, particularly if they are not to be carried on a moving vehicle.

In all essential respects, the operation of the device of FIG. 5 is the same as that of FIG. 4. However, when synchronous motor 38' is being run as a generator by the action of generator 36' as a motor, the power fed back to the source of power is three-phase a.c. just as three-phase a.c. is normally supplied directly to the motor 38' to drive it.

Basic Analysis

Figure 6:
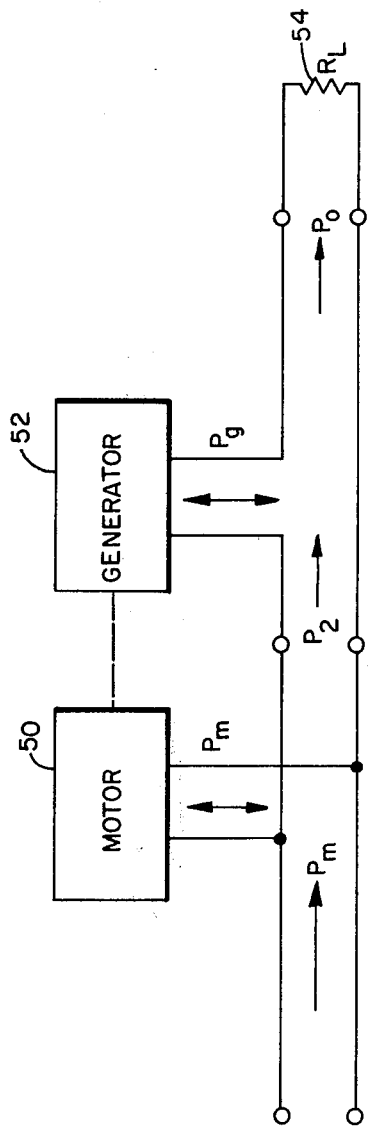
FIG. 6 is a block diagram showing electrical effects of the system of the present invention.

One's first reaction to the present invention is to compare its motor generator set as a d.c. motor controller with the classic Ward-Leonard System illustrated in FIG. 3. To do this, another schematic drawing, FIG. 6, showing a simplified electrical circuit of the present invention is provided.

In the Ward-Leonard System of FIG. 3, input power is transmitted directly through the drive motor 22 and the generator 24 to the load 26. Therefore the power transmission equations are:

Normal operation:

$$P_o = P_{in} \times \text{motor efficiency} \times \text{generator efficiency}$$

or $$P_O = P_{in} \text{eff}_m \text{eff}_g \quad (1)$$

The power rating of the MG set can be derived from the requirements of generator 24. Assuming that we want to deliver the maximum power, $$P_g = E_g I_L = E_b I_L$$

and the load current $L_L$ is $$I_L = \frac{E_b}{R_g + R_L}$$

then $$P_g = \frac{E_b^2}{R_g + R_L} \quad (2)$$

Thus the MG set must be rated to handle the maximum power delivered to the load.

Now consider the circulating MG system illustrated in FIG. 6 in which motor 50 is connected across the line and generator 52 is in series with the load 54.

Normal operation: G motoring ($E_g < E_b$)

$$P_2 = P_{in} + P_m \quad (3)$$

$$P_o = P_2 - P_g \quad (4)$$

$$P_m = P_g \text{eff}_m \text{eff}_g \quad (5)$$

combining to get the power transfer equation we have $$P_o = P_{in} - P_g(1 - \text{eff}_m \text{eff}_g) \quad (6)$$

Note that in this case the losses are a function of generator power. To derive this quantity we have $$P_g = E_g I_L$$

and the load current is $$I_L = \frac{E_b - E_g}{R_g + R_L}$$

(assuming negligible battery resistance) then $$P_g = \frac{E_g E_b - E_g^2}{R_g + R_L} \quad (7)$$

When $E_g = E_b$, there is no generated power $P_g$ and no power is delivered to the load. Therefore, for low power levels this System is at least competitive with the Ward-Leonard System in its efficiency.

Even more important is the difference in the ratings of the machines required. The peak power occurs when $E_g = E_b/2$. Substituting this point into equation 7) we have $$P_g = \frac{E_g E_b - E_g^2}{R_g + R_L} = \frac{E_b^2/2 - E_b^2/4}{R_g + R_L}$$

and $$P_g = \frac{E_b^2}{4(R_g + R_L)} \quad (8)$$

Comparing this result with the calculation in equation (2) shows that the rating of the MG set in the Circulating System can be ¼ of the rating for the MG set in the Ward-Leonard System. Thus the Circulating MG System has the potential for delivering all the benefits of the Ward-Leonard System, and more, without the weight penalty normally associated with an MG set controller.

Of course, many other analyses could be made, but the above simply gives some quantitative indication of the advantage of the system of the present invention over a conventional Ward-Leonard System without considering other advantages that may be inherent in the invention.

It will be understood by those skilled in the art that many variations of the present invention are possible. All such variations within the scope of the claims is intended to be within the scope and spirit of the present invention.

We claim:

1. A system for controlling a d.c. drive motor subject to variable load comprising:

a source of the d.c. current, a motor-generator set having a d.c. generator connected in series between the source of current and the drive motor such that common polarity terminals of the power source and the generator are connected together so that the generator generates a voltage in opposition to the power source, said generator having at least one field winding subject to control, and motor means rotationally coupled to the d.c. generator to drive the generator and electrically coupled to the source of d.c. power, and means to vary said at least one field winding whereby, when the d.c. drive motor is at rest, the field of the generator is controlled so that its generator voltage output is equal to but opposite to the voltage output of the power source, the motor generator means alternately acting as a motor to drive the generator and as a generator driven by the generator acting as a motor whereby power corresponding to the unused excess energy is fed back into the power source.

2. The motor control system of claim 1 in which the at least one field winding subject to control in the motor-generator set generator is regulated by a continuously variable means enabling smooth speed transitions in the drive motor.

3. The motor control system of claim 2 in which control means regulating the at least one field winding is capable of adjusting the system voltages to supply zero current to the drive motor at standstill.

4. The motor control system of claims 2 or 3 in which the control means regulating the at least one field winding is capable of adjusting the field such that system voltage has a range permitting direction reversal of the drive motor by increasing the generator field voltage beyond that of the condition producing drive motor standstill.

5. The motor control system of claims 2 or 3 in which the control means regulating the field is capable of being reversed itself to produce even greater forward effects of the drive motor than possible with the voltage of the source of d.c. power alone.

6. The motor control system of claims 2 or 3 in which the system controls torque continuously at any drive motor speed.

7. The motor control system of claims 2 or 3 in which the system provides regenerative braking to the drive motor as speed is reduced.

8. The motor control system of claim 1 in which the system employs a battery as the source of d.c. current.

9. The motor control system of claim 8 in which the motor of the motor-generator set is a d.c. motor and when driven as a generator aids to recharge the battery.

10. The motor control system of claim 1 in which the system employs a d.c. supply from any source of d.c. power.

11. The motor control system of claim 1 in which the system employs an a.c. supply with d.c. conversion means as the source of d.c. power.

12. The motor control system of claim 11 in which the a.c. supply provides power to an a.c. motor providing the motor of the motor-generator set.

13. The motor control system of claims 11 or 12 in which the a.c. supply is three phrase and the motor of the motor-generator set is a three phase a.c. motor.

14. A method of controlling a d.c. drive motor subject to variable load comprising:

connecting a d.c. generator of a motor-generator set in series opposition to a d.c. power source across the d.c. drive motor and connecting the motor of the motor-generator set to the same d.c. power source;

adjusting the field of the d.c. generator until the voltage output of the generator just balances the voltage of the d.c. power source so that the drive motor is not driven, and varying the field of the generator to reduce its strength to allow the net voltage to drive the motor in a forward direction.

15. The method of claim 14 in which the field may be reduced to zero and reversed in polarity to effectively add the voltage of the generator to the d.c. power source to increase the voltage supplied to the drive motor.

16. The method of claim 14 in which when the drive motor is to be reversed the generator field is increased in strength to effectively reverse the polarity applied across the drive motor.

17. The method of claims 14, 15, or 16 in which the generator field strength is varied smoothly and without interruption to provide a smooth transition in drive motor speed.

* * * * *